(12) United States Patent
Faith (10) Patent No.: US 9,807,008 B2
(45) Date of Patent: Oct. 31, 2017

(54) TOURNAMENT SCHEDULING

(71) Applicant: Google Inc., Mountain View, CA (US)

(72) Inventor: Joe Emmanuel Faith, San Francisco, CA (US)

(73) Assignee: Google Inc., Mountain View, CA (US)

( * ) Notice: Subject to any disclaimer, the term of this patent is extended or adjusted under 35 U.S.C. 154(b) by 343 days.

(21) Appl. No.: 14/297,980

(22) Filed: Jun. 6, 2014

(65) Prior Publication Data

US 2017/0279719 A1   Sep. 28, 2017

(51) Int. Cl.
*G06F 15/173* (2006.01)
*H04L 12/801* (2013.01)
*H04L 29/08* (2006.01)

(52) U.S. Cl.
CPC .......... *H04L 47/10* (2013.01); *H04L 67/1002* (2013.01); *H04L 67/1008* (2013.01); *H04L 67/1012* (2013.01); *H04L 67/1031* (2013.01)

(58) Field of Classification Search
CPC ............. H04L 67/1008; H04L 67/1012; H04L 67/1031; H04L 47/10
USPC .................................................. 709/203, 226
See application file for complete search history.

(56) References Cited

U.S. PATENT DOCUMENTS

| | | | | |
|---|---|---|---|---|
| 5,341,477 A | * | 8/1994 | Pitkin | G06F 9/505 709/203 |
| 5,359,510 A | | 10/1994 | Sabaliauskas | |
| 5,737,747 A | * | 4/1998 | Vishlitzky | G06F 12/0866 348/E5.008 |
| 5,829,046 A | * | 10/1998 | Tzelnic | G06F 12/0866 348/E5.008 |
| 5,933,603 A | * | 8/1999 | Vahalia | G06F 12/0866 348/E5.008 |
| 5,974,503 A | * | 10/1999 | Venkatesh | G06F 11/1076 348/E5.008 |
| 5,992,344 A | | 11/1999 | Bader | |
| 6,061,504 A | * | 5/2000 | Tzelnic | G06F 11/1464 348/E5.008 |
| 7,246,075 B1 | | 7/2007 | Testa | |
| 7,354,345 B2 | | 4/2008 | Bortnik et al. | |
| 8,002,630 B2 | | 8/2011 | Nguyen et al. | |

(Continued)

FOREIGN PATENT DOCUMENTS

WO   2010089900 A1   8/2010

*Primary Examiner* — Kristie Shingles
(74) *Attorney, Agent, or Firm* — Lerner, David, Littenberg, Krumholz & Mentlik, LLP (57) ABSTRACT

A method is provided for allocating tasks amongst system computing resources by using polling tournaments. The method includes receiving a request to schedule a task. The task is associated with a constraint identifying an amount of computing resources needed to perform the task. A subset of candidate devices from a plurality of server computing devices is randomly selected to compete in a polling tournament for scheduling the task. The subset includes a predetermined maximum number of candidate devices. The candidate devices of the subset are polled to determine an amount of computing capacity currently available in each candidate device. A winning candidate device of the polling tournament is determined based on the amount of computing capacity currently available in each of the polled candidate devices and the constraint. Thereafter, the task is scheduled to be run by the winning candidate device.

20 Claims, 7 Drawing Sheets

(56) References Cited

U.S. PATENT DOCUMENTS

| | | | |
|---|---|---|---|
| 8,225,319 B2 | 7/2012 | Laithwaite et al. | |
| 8,428,991 B1 | 4/2013 | Rooks | |
| 8,452,819 B1* | 5/2013 | Sorenson, III | G06F 3/0611 |
| | | | 707/809 |
| 8,458,130 B2* | 6/2013 | Kenthapadi | G06F 17/30017 |
| | | | 707/634 |
| 8,589,538 B2* | 11/2013 | Bargoti | G06F 3/061 |
| | | | 709/224 |
| 8,656,406 B2* | 2/2014 | Nakayama | G06F 9/505 |
| | | | 718/105 |
| 9,154,366 B1* | 10/2015 | Martin | H04L 29/08072 |
| 9,244,718 B2* | 1/2016 | Ajiro | G06F 9/5083 |
| 9,467,507 B2* | 10/2016 | Lee | G06F 9/5044 |
| 2007/0288466 A1* | 12/2007 | Bohannon | G06F 9/505 |
| 2015/0156281 A1* | 6/2015 | Krieger | H04L 67/42 |
| | | | 709/203 |

* cited by examiner

TOURNAMENT SCHEDULING

BACKGROUND

Scheduling is a technique by which tasks are given access or are otherwise allocated to certain system computing resources under various conditions. For example, a cloud computing service provider may schedule customer task/processes between different physical servers connected to their system. Typically, because the number and size of these tasks can be dynamic and unpredictable, a requirement for most systems is that they must be able to allocate these tasks across varying system computing resources. However, in most situations, there is a hard limit on an amount of load that a particular computing resource can be allocated to carry. In these situations, if there is an over commit of tasks to an overtaxed computing resource, it may result in a failure of the tasks and/or an unacceptable degradation in the performance of the system.

BRIEF SUMMARY

Aspects of the disclosure provide a method for allocating tasks amongst system computing resources by using polling tournaments. In one embodiment, the method includes receiving a request to schedule a task. The task may be associated with one or more constraints identifying an amount of computing resources needed to perform the task. A subset of candidate devices from a plurality of server computing devices may be randomly selected to compete in a polling tournament for scheduling the task. The candidate devices of the subset are polled to determine an amount of computing capacity currently available in each candidate device. A winning candidate device of the polling tournament may be determined based on the amount of computing capacity currently available in each of the polled candidate devices and the constraints. Thereupon, the task may be allocated to the winning candidate device.

In one example, the allocating comprises scheduling the task to be performed by utilizing the currently available computing capacity of the winning candidate server computing device. The winning candidate server has a greater amount of current computing capacity than a non-winning candidate server computing device. In this regard, the greater amount of current computing capacity satisfies the constraints associated with running the task.

In some examples, the subset comprises a predetermined maximum number of candidate server computing devices. The method may further include adjusting the maximum number of candidate server computing devices to compete in the polling tournament for scheduling the task. For example, the adjusting may includes incrementally increasing the maximum number of candidate server computing devices to compete in the polling tournament until a performance degradation threshold associated with allocating tasks has been satisfied. This performance degradation threshold may indicate a maximum amount of time allotted for allocating a given task to the winning candidate server computing device.

Another aspect of the disclosure provides a non-transitory computer readable medium storing instructions that, when executed by one or more processors, cause the one or more processors to perform a method. The method includes receiving a request to schedule a task. The task may be associated with one or more constraints identifying an amount of computing resources needed to perform the task. A subset of candidate devices from a plurality of server computing devices may be randomly selected to compete in a polling tournament for scheduling the task. The candidate devices of the subset are polled to determine an amount of computing capacity currently available in each candidate device. A winning candidate device of the polling tournament may be determined based on the amount of computing capacity currently available in each of the polled candidate devices and the constraints. Thereupon, the task may be allocated to the winning candidate device.

Yet another aspect of the disclosure provides a system. The system includes a memory and one or more processors in communication with the memory. The one or more processors are configured to receive a request to schedule a task. The task may be associated with one or more constraints identifying an amount of computing resources needed to perform the task. Using the processors, a subset of candidate devices from a plurality of server computing devices may be randomly selected to compete in a polling tournament for scheduling the task. The candidate devices of the subset are polled to determine an amount of computing capacity currently available in each candidate device. A winning candidate device of the polling tournament may be determined based on the amount of computing capacity currently available in each of the polled candidate devices and the constraints. Thereupon, the task may be allocated to the winning candidate device.

DETAILED DESCRIPTION

The present disclosure generally relates to techniques for optimally allocating tasks under different constraints amongst various system computing resources. For example, in some systems, a request may be received at a service provider to allocate or schedule certain consumer tasks to run on some set of system resources, e.g., computing servers. In this example, several constraints associated with allocating the tasks may be identified, such as a number and size of the tasks to be allocated for various system resources to perform, run or otherwise schedule to be executed.

To determine which system resource to allocate the new tasks, a subset of candidate server computing devices may be selected from amongst a plurality of physical system resources. For example, a small subset (e.g., two) of candidate servers may be randomly selected to participate in a "tournament" for allocating the consumer tasks. The tournament involves polling the candidate servers in the small subset into order to determine their respective currently available computing capacity. The candidate server with the greatest currently available computing capacity that can handle to the new task may be identified as the winner of the tournament. Thereafter, the winner may be scheduled or otherwise assigned to perform that task.

In some embodiments, performance aspects of the tournaments can be dynamically adjusted. For example, the number of candidate servers polled in each tournament can be changed, e.g., increased by a particular number. In some aspects, this may decrease system throughput by requiring more candidate resources to be polled, while conversely increasing system resource allocations in order to bring them closer to optimal performance.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Figure 1:
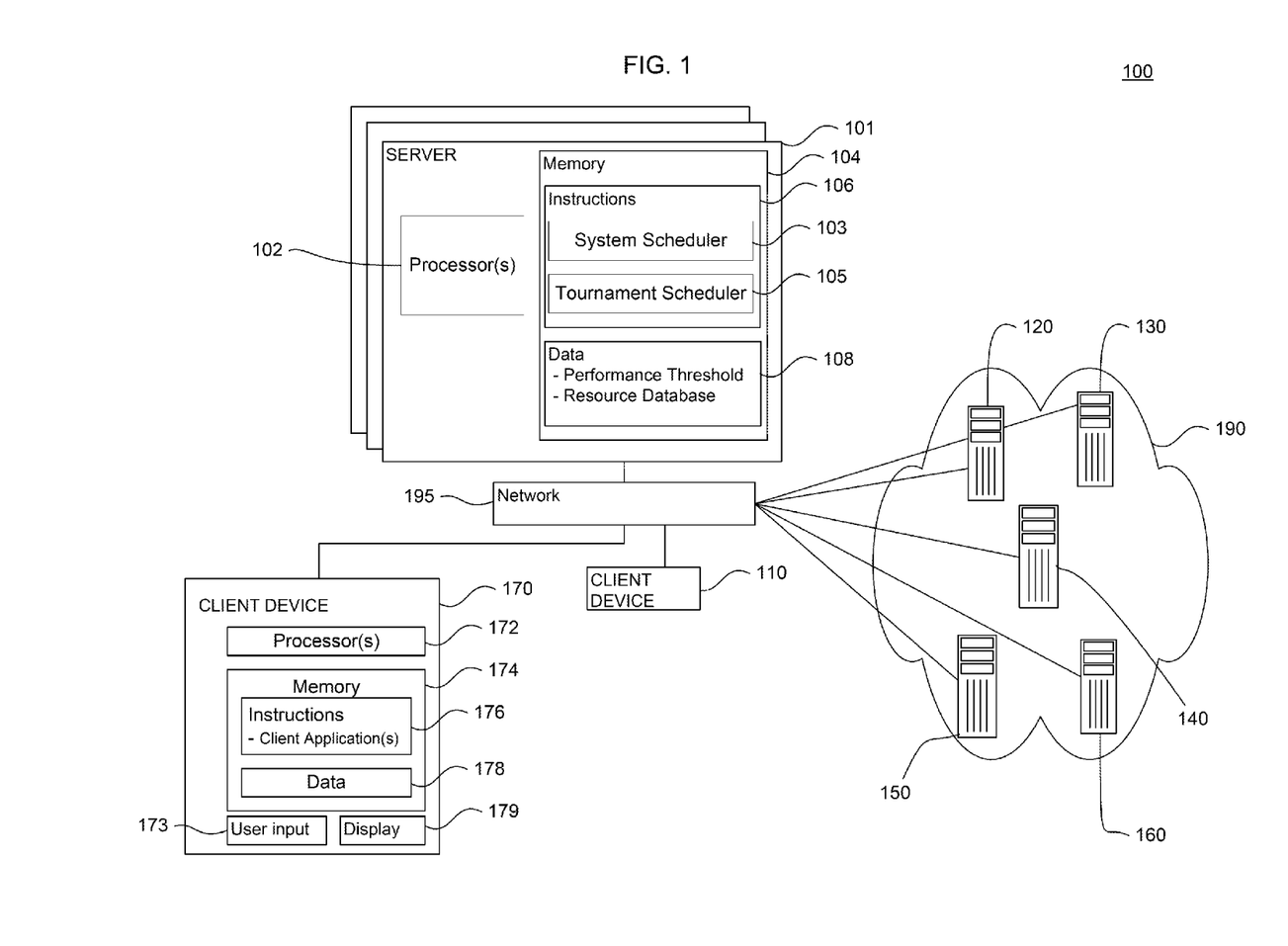
FIG. 1 is a block diagram of a system in accordance with aspects of the present disclosure.

FIG. 1 is a block diagram of a system 100, such as a system of a cloud computing service provider. This example should not be considered as limiting the scope of the disclosure or usefulness of the features of the present disclosure. For example, the techniques described herein can be employed on other types of systems where tasks are allocated across various types of system computing resources. In this example, the system 100 includes one or more servers, such as server 101, and a cluster 190 of server computing devices 120-160, coupled to a network 195 and a number of client devices, such as client devices 110 and 170, capable of communicating with the server 101 and the server computing devices 120-160 over the network 195. The server 101 may include one or more processors 102, memory 104, and other components typically present in general purpose computers.

Memory 104 of the server 101 may store information that is accessible by the processor 102, including instructions 106 that may be executed by the processor 102, and data 108. The memory 104 may be of any type of memory operative to store information accessible by the processors 102, including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The subject matter disclosed herein may include different combinations of the foregoing, whereby different portions of the instructions and data are stored on different types of media.

Although FIG. 1 functionally illustrates the processors 102 and memory 104 as being within the same block, the processors 102 and memory 104 may actually include multiple processors and memories that may or may not be stored within the same physical housing. For example, some of the instructions 106 and data 108 may be stored on removable CD-ROM and others within a read-only computer chip. Some or all of the instructions and data may be stored in a location physically remote from, yet still accessible by, the processors 102. Similarly, the processors 102 may actually comprise a collection of processors, which may or may not operate in parallel. For instance, various techniques described below as involving a single component (e.g., processor) may involve a plurality of components (e.g., multiple computing devices distributed over a network of computing devices, computers, "racks," etc. as part of a parallel or distributed implementation). Further, different computing devices may execute the various functions performed by the embodiments at different times as load is shifted from among computing devices. Similarly, various methods described below as involving different components (e.g., client device 110 and 170) may involve a single component (e.g., rather than device performing a determination described below, device may send the relevant data to the server 101 for processing and receive the results of the determination for further processing).

Instructions 106 of the server 101 may be a set of instructions to be executed directly (such as machine code) or indirectly (such as scripts) by the processor. In that regard, the terms "instructions," "steps" and "programs" may be used interchangeably herein. The instructions 106 may be stored in object code format for direct processing by the processor, or in any other computer language including scripts or collections of independent source code modules that are interpreted on demand or compiled in advance.

Data 108 may be retrieved, stored or modified by the processors 102 in accordance with the instructions 106. For instance, although the present disclosure is not limited by any particular data structure, the data 108 may be stored in computer registers, in a relational database as a table having a plurality of different fields and records, XML documents, or flat files. The data 108 may also be formatted in any computer-readable format such as, but not limited to, binary values, ASCII or Unicode. By further way of example only, the data 108 may be stored in compressed or uncompressed formats or computer instructions. Moreover, the data 108 may comprise any information sufficient to identify the relevant information, such as numbers, descriptive text, proprietary codes, pointers, references to data stored in other memories (including other network locations) or information that is used by a function to indicate the relevant data. For example, the data 108 can include a performance threshold value that represents a measure for indicating an optimal allocation of system resources to achieve some type of goal or targeted quality of service, e.g., the threshold goal may include the system 100 being able to allocate tasks to computing resources within a maximum time allotment for each task.

A typical system of the cloud-computing provider can include a large number of connected servers and client devices, with each different server and client device being at a different node of the network 195. Network 195, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

The client devices 110 and 170 may be configured similarly to the server 101, with a processor 172, memory 174, instructions 176, and all of the internal components normally found in a personal computer. By way of example only, the client device 170 may include a central processing unit (CPU), display device 179 (for example, a monitor having a screen, a projector, a touch-screen, a small LCD screen, a television, or another device such as an electrical device that is operable to display information processed by the processor 172), CD-ROM, hard-drive, user input device 173 (for example, a keyboard, mouse, touch-screen or microphone), speakers, modem and/or network interface device (telephone, cable or otherwise) and all of the components used for connecting these elements to one another.

The instructions 176 of the client devices 110 and 170 may include several types of client applications. In some aspects, these client applications may be configured to communicate with system 100 over network 195. By way of example only, the instructions 176 may include one or more client applications, e.g., a web browser application for performing a search query for retrieving information. In this example, a user may enter a search request into the web browser application. In response to the user's request, system 100 may perform the search query by allocating this job and any associated tasks to one or more computing resources of the system 100. Thereafter, a set of results may be communicated back from the computing resources to the client devices 110 and 170 via network 195.

Each client device may be a computing device. For example, client device 170 may be a laptop computer, a netbook, a desktop computer, and a portable personal computer such as a wireless-enabled PDA, a tablet PC or another type of computing device capable of obtaining information via a network like the Internet. Although aspects of the disclosure generally relate to a single client device 170, the client device 170 may be implemented as multiple devices with both portable and non-portable components (e.g., software executing on a rack-mounted server with an interface for gathering location information).

Although the client device 170 may include a full-sized personal computer, the subject matter of the present disclosure may also be used in connection with mobile devices capable of wirelessly exchanging data. For example, client device 170 may be a wireless-enabled mobile device, such as a Smartphone, or an Internet-capable cellular phone. In either regard, the user may input information using a small keyboard, a keypad, a touch screen or other means of user input. In various aspects, the client devices and computers described herein may comprise any device capable of processing instructions and transmitting data to and from users and other devices and computers including general purpose network computers lacking local storage capability.

System 100 may receive a plurality of client application request to allocate jobs to certain system computing resources. As discussed above, the jobs may be received from client devices 110 and 170 via network 195. For allocating the jobs, the system 100 may include a variety of dedicated system computing resources, such as a cluster 190 of computing machines. For example, as shown in FIG. 1, the cluster 190 may include a plurality of server computing devices 120-160.

In some embodiments, each of the server computing devices 120-160 may include multiple devices, such as a server rack including a plurality of machines or server blades (not shown). For example, one server rack can hold a rather large number of machines. In this regard, although only a few server computing devices 120-160 are shown in cluster 190 of system 100, the cluster 190 can include thousands, tens of thousands, or more machines. The cluster 190 supports jobs that may be composed of many tasks. The tasks can have various constraints including certain system requirements that are needed to successfully perform each task.

In some aspects, the system 100 may include a database for identifying the computing resources of the system 100 in which tasks can be allocated. For example, server 101 of the system 100 may include a resource database that includes information regarding an identity of the computing resources of cluster 190. For example, the resource database may include a number of resource identifiers that can be mapped to an individual or group of computing resource of system 100. In some embodiments, each resource identifier may identify an individual device from the computing server devices 120-160 of cluster 190. The resource identifiers may include, for example, a media access control address (MAC) identifier, universal unique identifier (UUID), globally unique identifier (GUID) or other types of unique identifiers for identifying specific the computing resource of system 100.

In some embodiments, the resource database may be a separate component from server 101. Alternatively, the resource database may be internally included with the server 101. For example, as shown, the resource database may be in the memory 104 of server 101. In other embodiments, the resource database can be divided into multiple components that can be geographically dispersed. The resource database may obtain information regarding the identity of the computing resources of cluster 190, for example, through a registration process. During this registration process, each identifier and other information regarding a particular computing resource may be recorded in the resource database as a possible candidate computing resource that may compete in the polling tournament.

In order to facilitate the operations of system 100 for optimally allocating tasks across different server computing devices, the system 100 may include multiple schedulers. Each scheduler may include or be in communication with the processors 102 and may perform a different scheduling function. As shown in FIG. 1, server 101 includes a job scheduler 103 and a tournament scheduler 105. The schedulers 103 and 105 may access information regarding the tasks associated with certain client application request to be performed on or to access any computing device in the system 100.

Job scheduler 103 can allocate tasks to one or more system resources of system 100, such as the server computing devices 120-160 of cluster 190. The job scheduler 103 may allocate the tasks based on certain constraint information associated with each task and the results of a polling tournament to determine which system resource a given task may be allocated to perform. In that regard, the tournament scheduler 105 may schedule the polling tournament by selecting a subset of candidate devices, for example, from the computing server devices 120-160 of cluster 190. In the polling tournament, the selected subset of candidate devices may compete against each other in order to determine which device may be allocated a given task as described in detail below.

Techniques for scheduling tasks amongst various computing resources based on the results of a polling tournament, for example, using system 100 as discussed above, will now be described. As previously discussed, the following operations do not have to be performed in the precise order described below. Rather, as mentioned above, various operations can be handled in a different order or simultaneously, and operations may be added or omitted.

Figure 2:
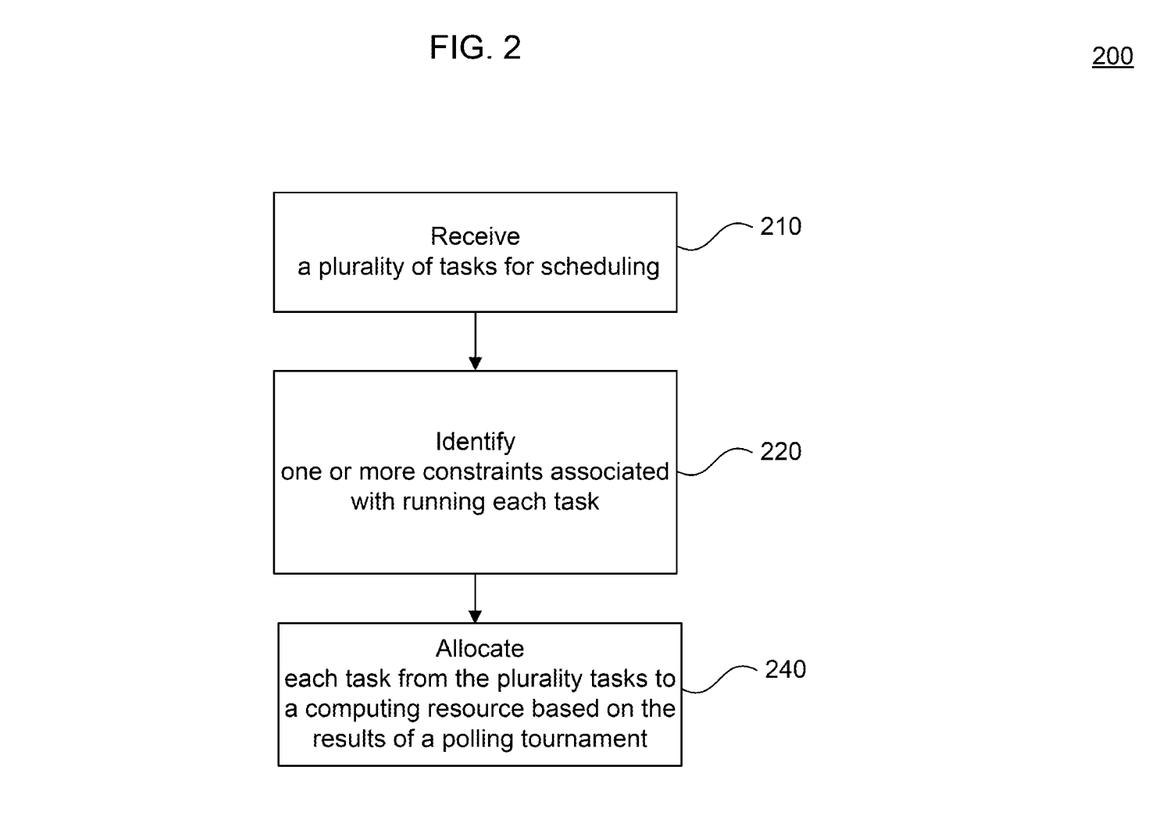
FIG. 2 is an example flow diagram in accordance with aspects of the disclosure.

FIG. 2 is an example flow diagram 200, for example, which may be used for analyzing client application requests. As discussed above, system 100 may receive a plurality of client application request for allocating certain jobs/tasks to be performed across different system computing resources of the system. In doing so, the system 100 may employ the features of flow diagram 200 to identify certain information regarding the tasks of each client application request in order to ascertain any constraint requirements that can be used to determine the outcome of the polling tournament.

In block 210, a plurality of tasks may be received. For example, the plurality of tasks may be received at one or more servers of a system, such as server 101 of system 100 in FIG. 1. As discussed above, these tasks may be associated with performing some aspect of a specific client application request or job. For example, a client application connected to the system may submit a number of jobs for the system to perform.

In block 220, one or more constraints associated with performing each task may be identified, for example, by the server 101. Constraints can be specific to an individual task or group of tasks or can apply to all tasks associated with a given client application request. In some aspects, the constraints can be identified based on information in the client request and/or information regard a certain system objective or service level agreement (SLA) associated with the system, such as minimizing the amount of time to schedule a given task to a system resource.

Examples of some constraints can include, e.g., a number/size of the tasks to be allocated, an amount resources needed to run each task and an amount of load each system resource can handle before there is a failure, rather than a graceful degradation in performance of that resource. In some embodiments, the information associated with the constraints can include a constraint identifier that identifies, e.g., how much processing capabilities, memory, etc., is or should be used to perform the task, and system resource requirements for performing the tasks, e.g., data objects, machine types or pool of machines, operating systems, preferences, etc.

In block 230, each task received in block 210 may be allocated by the server 101 to a particular computing resource based on the results of a polling tournament that may be scheduled by the system's tournament scheduler. For example, continuous and dynamic polling tournaments are conducted in order to determine which computing resources from a selected subset of resources has a more spare capacity for performing the task. Further aspects of the polling tournament as discussed below with respect to FIGS. 3A-B.

Figure 3A:
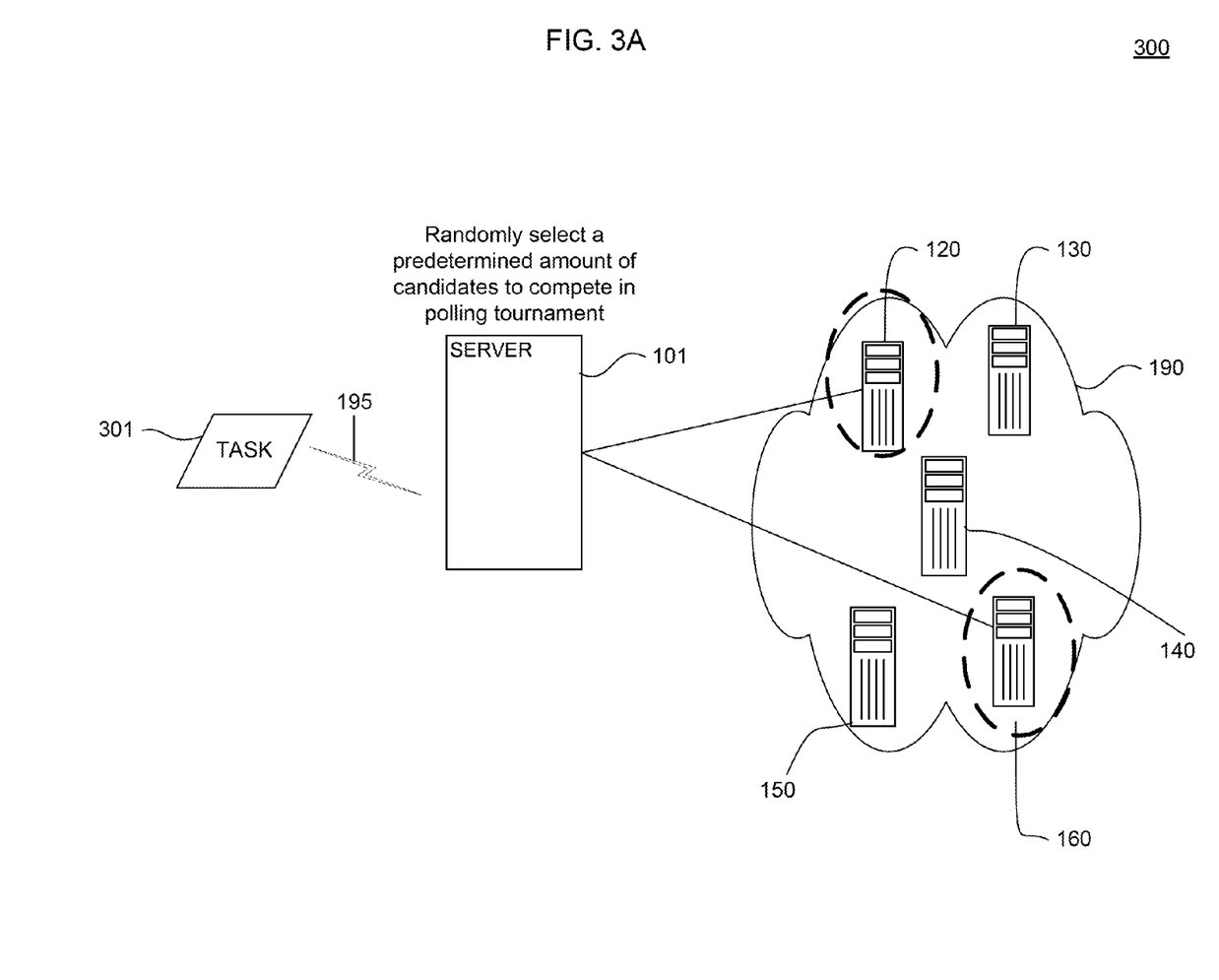
FIGS. 3A-3B are examples of a polling tournament in accordance with aspects of the disclosure.

FIG. 3A is an illustration of aspects of a polling tournament 300, for example, using the tournament scheduler 105 of system 100 in FIG. 1. In this example, the polling tournament 300 includes a task 301 to be performed by a system computing resource that is transmitted to server 101 of the system via network 195. In order to perform the task 301, the server 101 may allocate the task 301 to a particular computing resource of cluster 190. For example, the computing resources may be selected from a plurality of available computing resources, such as computing server devices 120-160, of the cluster 190. A subset of these computing resources may compete in the pooling tournament 300 in order to determine which one may be allocated the task 301.

To choose computing resources for the polling tournament 300, a subset of candidate server computing devices may be selected from the devices in cluster 190. In some aspects, this subset may include a predetermined maximum number of candidate devices that are randomly selected. For example, as shown in FIG. 3A, two candidate devices (e.g., candidate server computing devices 120 and 160) are randomly selected to compete in polling tournament 300. In some embodiments, the random selection of candidate devices may be determined based on a hash function. For example, a hash function may be used to randomly generate a number key that may represent a potential candidate device. This number key may be mapped to a particular device identifier stored in the resource database of server 101 for that potential candidate device.

An advantage of randomly selecting a subset of candidate devices from a larger group of devices to compete in the polling tournament 300 is that the system ends up with a near optimal allocation of tasks to healthy servers. For example, if in a system having one thousand servers with only one server typically busy with a task at any given time, by randomly selecting two candidates to compete in the polling tournament the odds of allocating a task to an overtaxed server becomes one in a million ($\frac{1}{1000}*\frac{1}{1000}$). By increasing the number of candidates by one more to three candidates the odds increase to one in a billion ($\frac{1}{1000}*\frac{1}{1000}*\frac{1}{1000}$). Thus, there is even far less of a chance for a given scheduled task to fail due to the fact that the server to which the given scheduled task is allocated to be performed is full.

Figure 3B:
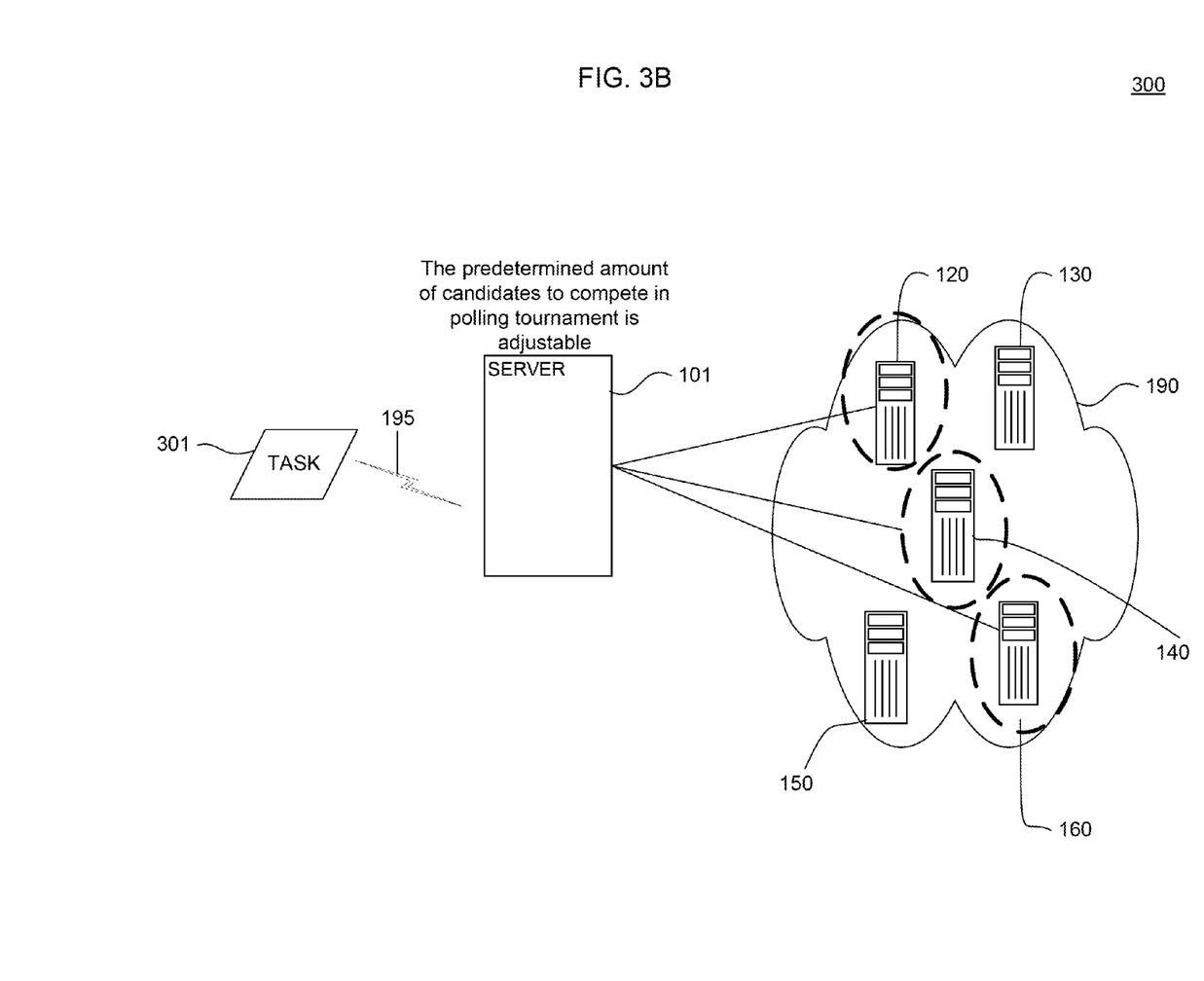

Turning to FIG. 3B, in this example of aspects of the polling tournament 300, the maximum number of candidate devices has been incrementally increased, or increased from two to three candidate devices. As shown, three candidate devices (e.g., candidate server computing devices 120, 140 and 160) are randomly selected to compete in the tournament 300.

Although sampling more candidate resources in the polling tournament may make the resource allocation closer to optimal, this requires more polling which may take longer and reduces network throughput and/or system performance. Because of this, the tradeoff between optimality and throughput/performance must be balanced when changing the number of candidate resources polled in each tournament. For example, the maximum number of candidate server computing devices to compete in the polling tournament may be incrementally increased (e.g., by increasing the maximum number of candidate server computing devices by one candidate server computing device) until a performance threshold has been satisfied or exceeded. This performance threshold may be associated with information indicating a level of performance degradation in the system based on the increment. For example, the performance degradation may indicate a maximum time allowed for the system to allocate a task to a computing resource before a type of service level agreement associated with the system has been violated.

Figure 4:
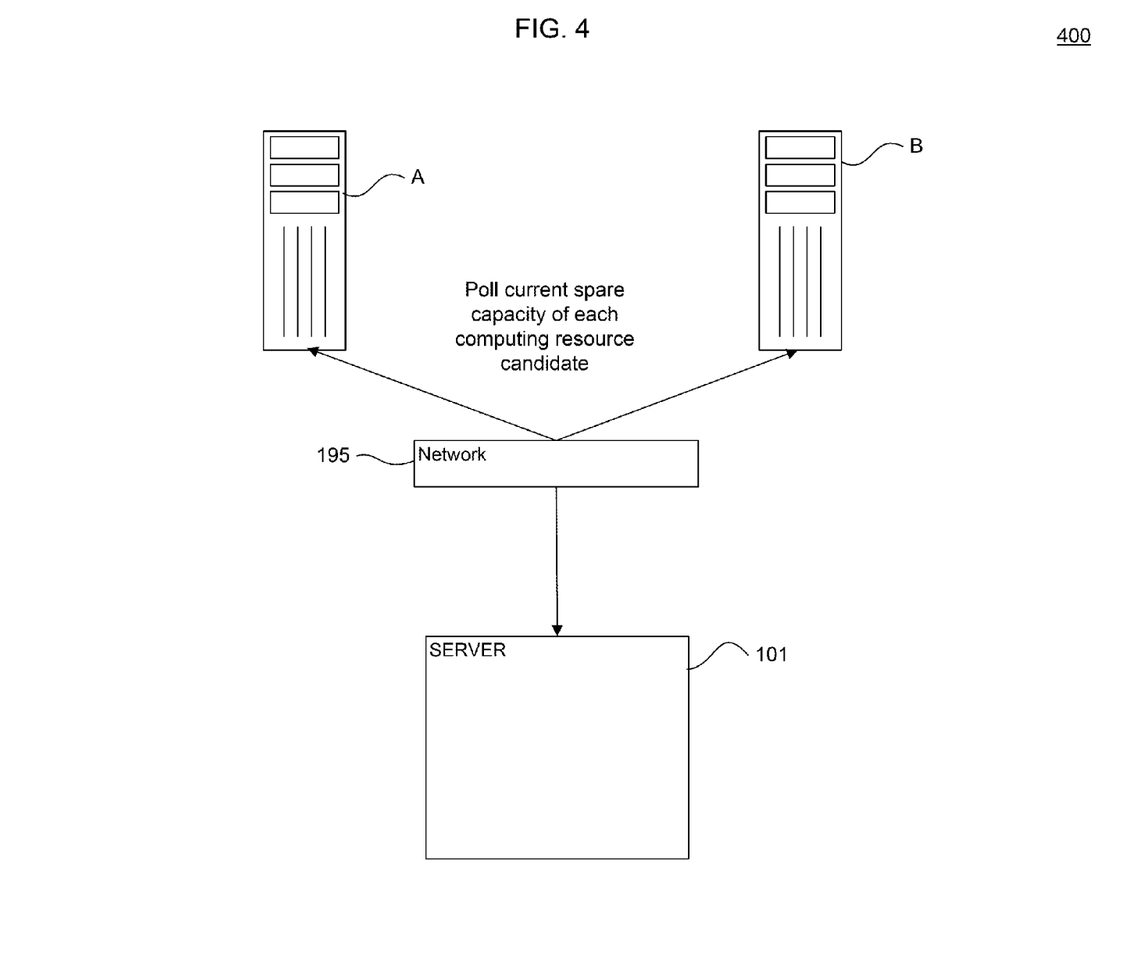
FIG. 4 is another example of a polling tournament in accordance with aspects of the disclosure.

FIG. 4 is an example illustration 400 of tournament candidate servers A and B, which may be randomly selected from the computing server computing devices of system 100. When the tournament starts, each candidate competing in the tournament may be polled in order to determine a current level of available computing capacity for that candidate. The current computing capacity may indicate the capacity of tournament candidate to perform certain tasks. For example, the current computing capacity may indicate a current level of computing resources that includes an available level of memory, CPU cycles, processors, storage space, etc.

To obtain information from the tournament candidate servers A and B regarding their current computing capacity, several techniques may be employed. In one example technique, the server 101 may transmit a message communication to the candidates using network 195. For example, the message communication can be sent to each candidate, one at a time or simultaneously, asking each about a current available level of computing resources. In response, the tournament candidates A and B may transmit a reply message with the requested computing resource information.

In some examples, server 101 may directly retrieve available computing resource information from each tournament candidate. For example, the server 101 may open a communication port using network 195 for establishing a communication channel between each tournament candidate and the sever 101. Using this communication channel, the server 101 may poll each tournament candidate for the current availability level of computing resources. Still further, other techniques may be used for obtain current computing resource information from competing tournament candidates A and B in order to determining a winner of the polling tournament 300.

Figure 5:
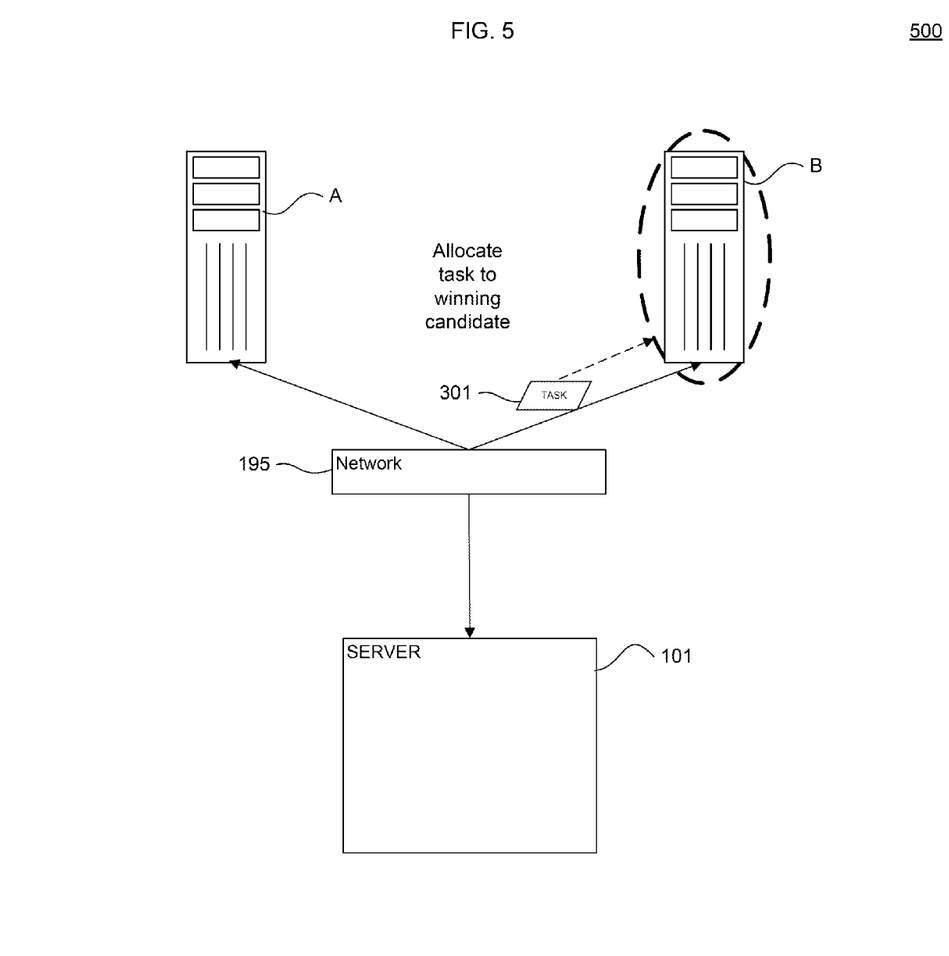
FIG. 5 is an example of allocating a task to a winning candidate in accordance with aspects of the disclosure.

In FIG. 5, an example illustration 500 of a winning candidate is shown. For example, the winning candidate server (e.g., tournament candidate server B) is the candidate that has a greater amount of currently available computing capacity as compared to a non-winning candidate, such as tournament candidate server A. In this regard, the server 101 may verify the winner by determining whether this greater amount of available computing capacity satisfies the one or more constraints associated with running the task 301. For example, the server 101 may compare the resource requirements of the constraint to the available resources of the winning candidate. Once the winner of the tournament has been identified, the server 101 may allocate the task 301 to the winning candidate. For example, the task 301 may be scheduled onto the tournament candidate server B which may use the available computing capacity to perform the task 301.

Figure 6:
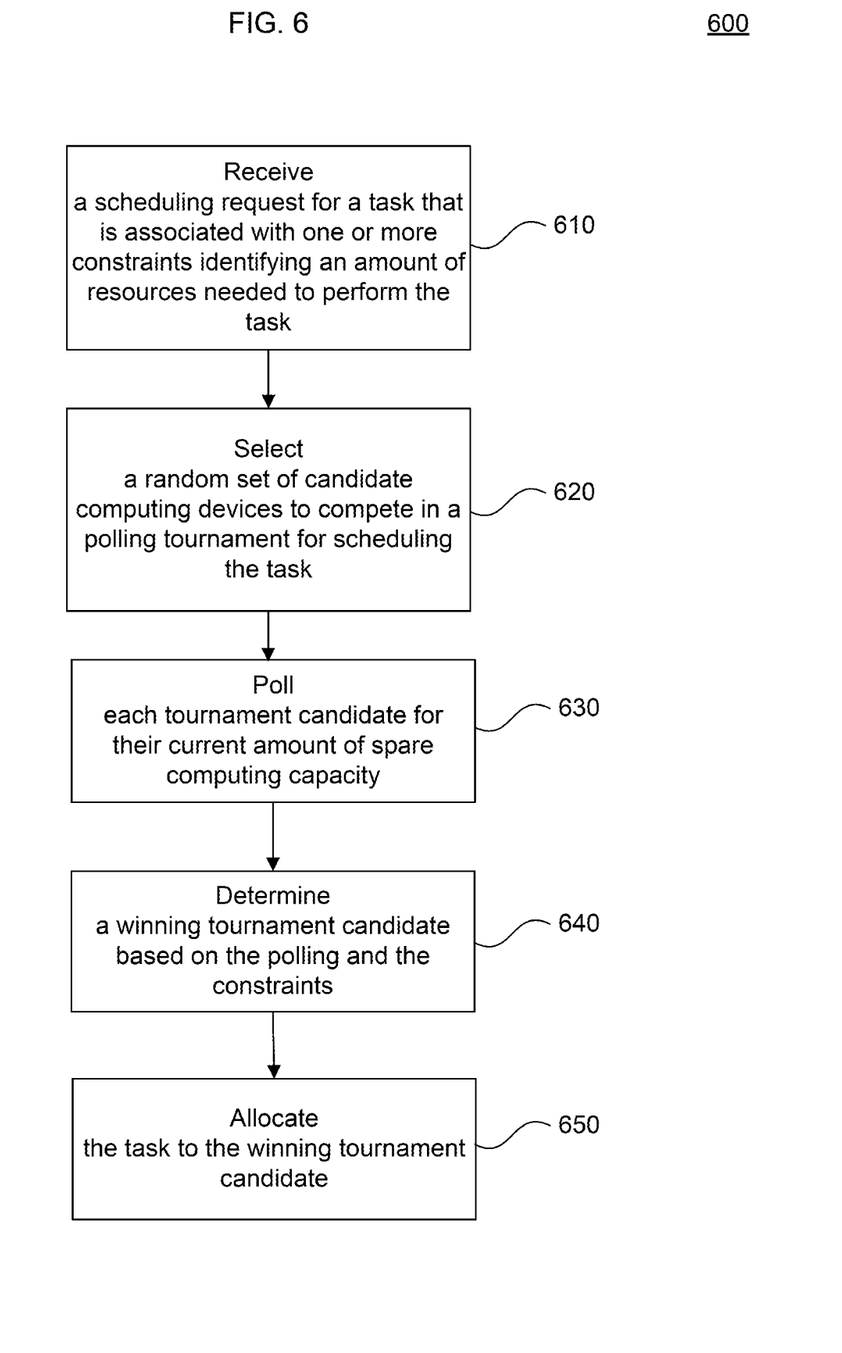
FIG. 6 is another example flow diagram in accordance with aspects of the disclosure.

FIG. 6 is a flow diagram depicting an example of some of the aspects described above for conducting polling tournaments for scheduling tasks that may be performed by one or more server computing devices, such as computing devices 120-160 of FIG. 1. In block 610, a scheduling request may be received for a task associated with one or more constraints. For example, the task may be related to a client application request to perform certain jobs that may be allocated across a number of different system computing resources. The constraints may identify an amount of computing resources needed to perform the task.

In block 620, a random subset of computing server devices may be selected to compete in a polling tournament for scheduling the task. For example, the random subset of devices may select from a plurality of computing devices that are configured to support the task. A predetermined amount of the plurality of computing devices may be selected to include the subset. For example, the predetermined amount may be as few as two of the computing server devices. In some embodiments, this predetermined amount may be adjusted or otherwise incremented in order to achieve a near optimal allocation of task to the different computing server devices.

In block 630, each tournament candidate may be polled for their current amount of spare computing capacity. For example, to poll the candidates, a message communication may be sent to each tournament candidate and in response the candidate may return information regarding its current available capacity. Alternatively, the information regarding current available capacity may be retrieved directly from the tournament candidate using a communication channel.

In block 640, a winning tournament candidate may be determined based on the polling conducted in block 630 and the constraint identified in block 610. For example, the winning candidate may be the device with the greatest amount of current spare computing capacity. In that regard, the current spare computing capacity of the winning tournament candidate may be sufficient to satisfy the constraint associated with performing the task.

In block 650, the task may be allocated to the winning tournament candidate. For example, the task received in block 610 may be scheduled on or by the winning tournament candidate, which may perform the task by using the currently available computing capacity of the winning candidate.

The above-described aspects of the present disclosure may be advantageous for efficiently allocating tasks to servers in a system by using polling tournaments. For example, random selection of tournament candidates reduces the amount of computing resources needed to generate the set of candidates for the polling tournaments. In addition, by polling only a small number of candidate servers as opposed to all of the servers in the system, further reductions may be achieved in the computing resources required by the system to allocate task. Particularly, in systems with a larger number of computing server resources for tasks to be allocated across. Moreover, the various techniques and parameters disclosed within may be further reconfigured to minimize any degradation in system performance while increasing the efficiency and speed of allocating system tasks to be performed.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended.

The invention claimed is:

1. A method, comprising:

receiving, by one or more computing devices, a request to schedule a task, the task being associated with one or more constraints identifying an amount of computing resources needed to perform the task;

randomly selecting independent of the one or more constraints, by the one or more computing devices, a subset of candidate server computing devices from a plurality of server computing devices to compete in a polling tournament for scheduling the task, the subset comprising at least two candidate server computing devices;

after randomly selecting the subset of candidate server computing devices, polling, by the one or more computing devices, the candidate server computing devices of the subset to determine an amount of computing capacity currently available in each candidate server computing device;

comparing, by one or more computing devices, the amount of computing capacity currently available in each of the candidate server computing devices of the subset;

determining, by the one or more computing devices, a winning candidate server computing device of the polling tournament based on the comparison of the amount of computing capacity currently available in each of the polled candidate server computing devices and the constraints; and allocating, by the one or more computing devices, the task to the winning candidate server computing device.

2. The method of claim 1, wherein the allocating comprises scheduling the task to be performed by utilizing the currently available computing capacity of the winning candidate server computing device.

3. The method of claim 1, wherein the subset comprises a predetermined maximum number of candidate server computing devices.

4. The method of claim 3, wherein the predetermined maximum number of candidate server computing devices is two.

5. The method of claim 3, further comprising adjusting the maximum number of candidate server computing devices to compete in the polling tournament for scheduling the task.

6. The method of claim 5, wherein the adjusting comprises incrementally increasing the maximum number of candidate server computing devices to compete in the polling tournament until a performance degradation threshold associated with allocating tasks has been satisfied.

7. The method of claim 6, wherein the performance degradation threshold indicates a maximum amount of time allotted for allocating a given task to the winning candidate server computing device.

8. The method of claim 1, wherein the winning candidate server has a greater amount of current computing capacity than a non-winning candidate server computing device.

9. The method of claim 8, wherein the greater amount of current computing capacity satisfies the constraints associated with running the task.

10. A non-transitory computer readable medium storing instructions that, when executed by one or more processors, cause the one or more processors to perform a method, the method comprising:
   receiving, by the one or more processors, a request to schedule a task, the task being associated with one or more constraints identifying an amount of computing resources needed to perform the task;
   randomly selecting, independent of the one or more constraints, by the one or more processors, a subset of candidate server computing devices from a plurality of server computing devices to compete in a polling tournament for scheduling the task, the subset comprising at least two candidate server computing devices;
   after randomly selecting the subset of candidate server computing devices, polling, by the one or more processors, the candidate server computing devices of the subset to determine an amount of computing capacity currently available in each candidate server computing device;
   comparing, by one or more computing devices, the amount of computing capacity currently available in each of the candidate server computing devices of the subset;
   determining, by the one or more processors, a winning candidate server computing device of the polling tournament based on the comparison of the amount of computing capacity currently available in each of the polled candidate server computing devices and the constraints; and
   allocating, by the one or more processors, the task to the winning candidate server computing device.

11. The non-transitory computer readable medium of claim 10, wherein the subset comprises a predetermined maximum number of candidate server computing devices.

12. A system, comprising:
   a memory; and
   one or more processors in communication with the memory, the one or more processors being configured to:
   receive a request to schedule a task, the task being associated with one or more constraints identifying an amount of computing resources needed to perform the task;
   randomly select, independent of the one or more constraints, a subset of candidate server computing devices from a plurality of server computing devices to compete in a polling tournament for scheduling the task, the subset comprising at least two candidate server computing devices;
   after randomly selecting the subset of candidate server computing devices, poll the candidate server computing devices of the subset to determine an amount of computing capacity currently available in each candidate server computing device;
   compare the amount of computing capacity currently available in each of the candidate server computing devices of the subset;
   determine a winning candidate server computing device of the polling tournament based on the comparison of the amount of computing capacity currently available in each of the polled candidate server computing devices and the constraints; and
   allocate the task to the winning candidate server computing device.

13. The system of claim 12, wherein to allocate the task the one or more processors are further configured to schedule the task to be performed by utilizing the currently available computing capacity of the winning candidate server computing device.

14. The system of claim 12, wherein the subset comprises a predetermined maximum number of candidate server computing devices.

15. The system of claim 14, wherein the predetermined maximum number of candidate server computing devices is two.

16. The system of claim 14, wherein the processors are further configured to adjust the maximum number of candidate server computing devices to compete in the polling tournament for scheduling the task.

17. The system of claim 16, wherein the adjusting comprises incrementally increasing the maximum number of candidate server computing devices to compete in the polling tournament until a performance degradation threshold associated with allocating tasks has been satisfied.

18. The system of claim 17, wherein the performance degradation threshold indicates a maximum amount of time allotted for allocating a given task to the winning candidate server computing device.

19. The system of claim 12, wherein the winning candidate server has a greater amount of current computing capacity than a non-winning candidate server computing device.

20. The system of claim 19, wherein the greater amount of current computing capacity satisfies the constraints associated with running the task.

* * * * *